United States Patent
Völpel

[19]

[11] Patent Number: 5,964,454
[45] Date of Patent: Oct. 12, 1999

[54] PISTON CYLINDER UNIT WITH A PISTON HAVING TOLERANCE COMPENSATION

[75] Inventor: Stefan Völpel, Koblenz, Germany

[73] Assignee: Stabilus GmbH, Koblenz, Germany

[21] Appl. No.: 09/116,146

[22] Filed: Jul. 16, 1998

[30] Foreign Application Priority Data

Aug. 8, 1997 [DE] Germany .............................. 197 34 375

[51] Int. Cl.⁶ ................................ F16F 9/02; B06G 11/26
[52] U.S. Cl. ...................... 267/124; 267/120; 188/322.22
[58] Field of Search ............................... 188/300, 322.19, 188/322.22; 267/120, 124

[56] References Cited

U.S. PATENT DOCUMENTS

| | | |
|---|---|---|
| 2,907,330 | 10/1959 | Laub . |
| 2,912,069 | 11/1959 | Dillenburger ...................... 188/322.22 |
| 2,992,052 | 7/1961 | De John . |
| 4,156,523 | 5/1979 | Bauer ....................................... 267/120 |
| 4,263,488 | 4/1981 | Freitag et al. ........................... 267/120 |
| 4,310,148 | 1/1982 | Freitag ..................................... 267/120 |
| 5,074,389 | 12/1991 | Slocum ............................... 188/322.22 |
| 5,797,593 | 8/1998 | Oyaizu ................................ 188/322.19 |
| 5,799,759 | 9/1998 | Koch ....................................... 188/300 |

FOREIGN PATENT DOCUMENTS

| | | |
|---|---|---|
| 879038 | 6/1953 | Germany . |
| 906408 | 3/1954 | Germany . |
| 19539616 | 4/1997 | Germany . |
| 1355789 | 6/1974 | United Kingdom . |

*Primary Examiner*—Chris Schwartz
*Attorney, Agent, or Firm*—Baker & Botts, L.L.P.

[57] ABSTRACT

A piston-cylinder unit includes a cylinder having an axis and an inner surface and a piston assembly attached to a piston rod and received in the cylinder for axial movement. The piston assembly includes a piston body, which has a plurality of radially resiliently deformable wall portions at its perimeter, the wall portions being spaced apart circumferentially from each other. Each wall portion has opposite ends that are joined integrally with the piston body and is defined by an opening in the body. Each wall portion engages the inner surface of the cylinder and deforms resiliently radially with respect to the axis of the cylinder to compensate for tolerance variations in the inner surface of the cylinder. The piston assembly may include a piston ring, which is received on the piston body with centering surfaces to restrict its radial movement and which functions to block and unblock a fluid bypass between sections of the cylinder on opposite sides of the piston assembly.

7 Claims, 3 Drawing Sheets

PISTON CYLINDER UNIT WITH A PISTON HAVING TOLERANCE COMPENSATION

TECHNICAL FIELD OF THE INVENTION

The present invention relates to a piston-cylinder unit, such as a gas spring, in which a piston carried on a piston rod is guided by engagement of guide surfaces of the piston with the inner surface of a cylinder. In such piston-cylinder units, one purpose of the piston is to guide the piston rod, which extends from and retracts into the cylinder through a guide/seal assembly in the rod end of the cylinder.

BACKGROUND OF THE INVENTION

DE 195 39 616 A1 relates to a cylinder-piston rod unit that is filled with fluid, and in particular a gas spring, the piston of which is provided with spring tongues that have rounded ends that engage resiliently the inner wall of a cylinder, while the rest of the piston is free from engagement with the cylinder. The spring tongues are shaped so that before assembly of the piston into the cylinder their radially outermost tips are spaced apart from the piston axis by a distance that is greater than the radius of the cylinder and after assembly bear against the inner wall of the housing with a predetermined prestress. For damping the movement of the piston near the end of its extension stroke (movement out of the cylinder), the cylinder has a groove that narrows near the rod end of the cylinder.

It is possible for the spring tongues, in the assembled piston/cylinder, to become subject to friction forces higher than those created by the prestress alone as a result of the effect of friction, together with rotation of the piston in a direction in which the tips of the tongues "lead" with respect to the roots of the tongues. Similarly, the guiding effect of the tongues may be reduced in the event of rotation of the piston in a direction in which the tips of the tongues trail the roots as a result of friction in the circumferential direction producing forces on the tongues that counteract the radially outward prestress. The above effects may be even more pronounced when a spring tongue gets stuck in the longitudinal damping groove in the cylinder. Furthermore, a spring tongue may become caught in the longitudinal groove in the cylinder and reduce the cross section of the groove, so that the intended function of the groove is no longer performed.

There is a critical moment in assembly of the piston/cylinder when the piston rod, with the piston, is introduced into the cylinder. Care must be taken to see that the piston ring is not pinched along the edge of the open cylinder. That possibility exists to a considerable degree in the piston ring of DE 195 39 616 A1.

U.S. Pat. No. 2,992,052 discloses a self-sealing piston carried by a piston rod and received for axial movement in a cylinder. The inner surface of the cylinder is engaged by part of the outer surface of the piston, namely, a radially resilient peripheral wall portion, which extends continuously around the circumference of the piston and provides tolerance compensation with respect to the inside diameter of the cylinder. The peripheral wall portion forms with an external surface of the body of the piston an annular recess or groove, which provides space for deformation of the peripheral elastic wall portion.

One disadvantage of the piston of U.S. Pat. No. 2,992,052 is that even small variations in the thickness of the elastic wall portion can lead to significant differences in the elasticity in the wall, owing to which the amount of friction can be restricted only with great difficulty. The elastic wall portion is structurally a ring, and deformation requires both compressive stresses in the circumferential direction as well as bending in the radial direction.

In addition, a tapered transition is present at the transition from the elastic wall to the piston body. This tapered transition represents an active hydraulic or pneumatic surface, the effect of which must be taken into account. Depending upon the direction from which an operating pressure acts, a compressive force component builds up which allows the elastic wall to lift away from or press more strongly on the inside diameter of the cylinder.

SUMMARY OF THE INVENTION

An object of the present invention is to further improve a piston for a piston-cylinder unit wherein radial play between the piston and the inner surface of the cylinder is minimized and as constant as possible frictional conditions are present. It is, moreover, an object to provide for tolerance variations in the cylinder without reducing the effectiveness of the piston in guiding the piston rod.

According to the present invention, the foregoing objects are accomplished by a piston-cylinder unit that includes a cylinder having an axis and an inner surface and a piston assembly attached to a piston rod and received in the cylinder for axial movement. The piston assembly has a piston body, the piston body having a plurality of radially resiliently deformable wall portions at a perimeter of the piston body, the wall portions being spaced apart circumferentially from each other. Each wall portion has opposite ends that are joined integrally with the piston body and is defined by an opening in the body. Each wall portion resiliently engages the inner surface of the cylinder and deforms resiliently radially with respect to the axis of the cylinder to compensate for tolerance variations in the inner surface of the cylinder. The deformable wall portions do not have active hydraulic or pneumatic surfaces that produce a radial force component that in turn results in a negative effect on the frictional forces present.

In preferred embodiments, each opening defined by a radially resiliently deformable wall portion is curved in the circumferential direction with respect to the axis and is defined by an outer surface having a first radius and an inner surface having a second radius, the first radius being greater than the second radius. That configuration enables the opening to progressively close up upon large radially inward deformations of the wall portions.

It has been found to be especially advantageous for the piston body to be of generally polygonal shape in plan, with the deformable wall portions located at the corners and recesses forming parts of fluid bypasses located between the corners. With such a configuration there are no peripheral regions of the piston body that functionally provide no advantage. The deformable wall portions occupy the corners, and the recesses between them are used to advantage for parts of the fluid bypasses.

In preferred embodiments, the outwardly facing surface of each deformable wall portion of the piston body has a radius smaller than the radius of the inner surface of the cylinder. That arrangement affords contacts between the deformable wall portions ranging from essentially line contact to varying degrees of areal contact, according to tolerance variations in the cylinder.

It is possible, though optional, for the piston assembly to include a piston ring, which is received on the piston body for axial movement relative to the piston body and depending upon its axial position unblocks or blocks a flow-through cross section of the piston assembly. This measure serves to influence the rate of the travel-out motion of the rod.

To keep the piston ring from being squeezed over the edge of the open cylinder upon assembly of the piston in the cylinder and thus being damaged, the piston body, preferably, has centering surfaces for restricting radial movements of the piston ring. For example, the centering surfaces may be arranged in the corners of the piston body. It is desirable that the piston ring be received on the piston body between the radially resiliently deformable wall portions and a section of the cylinder that diminishes in volume when the piston rod moves in a travel-in direction. The advantage of this measure lies in that the size and shape of the openings that form the deformable wall portions can be varied in the design of the piston body. The piston ring must not be able to close off those openings. In a travel-out motion, the piston ring does not lie on the openings and in a travel-in motion bypasses, which are independent of the openings, are unblocked.

DESCRIPTION OF THE DRAWINGS

For a more complete understanding of the present invention, and the advantages thereof, reference may be made to the following description of an exemplary embodiment, taken in conjunction with the accompanying drawings, in which:

FIG. 3b taken along a broken plane represented generally by the lines 3b—3b of FIG. 3a is a side cross-sectional view of the piston body of FIGS. 1, 2 and 3a;

FIG. 4b is a top plan view of the piston body of FIG. 4a.

DESCRIPTION OF THE EMBODIMENT

Figure 1:
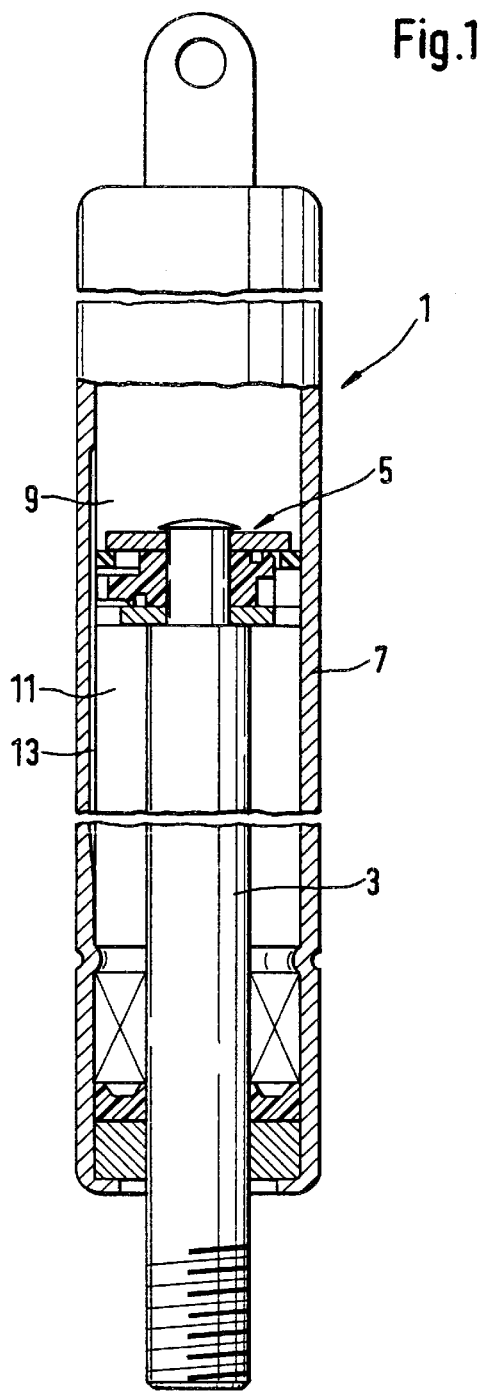
FIG. 1 is a generally schematic axial cross-sectional view of an embodiment of a piston/cylinder unit.

FIG. 1 shows a piston-cylinder unit in the structural form of a gas spring, which has an axially movable piston rod 3 received partly within a cylinder 7 and carrying a piston assembly 5. The piston assembly 5 divides the cylinder into two working spaces 9 and 11, the working spaces being filled with gas, owing to which a force due to the pressure of the gas in the spaces is exerted on the piston rod that biases the piston rod in a "travel-out" direction. Optionally, the cylinder may have a bypass groove 13, which permits the gas in the rod-end section 11 to flow past the piston assembly 5 into the closed-end section 9 as the rod extends from the piston in the travel-out direction. The groove 13 becomes gradually smaller in cross-section near the rod end of the cylinder in order to provide damping of the movement of the piston rod near the end of a travel-out stroke—the reduced flow cross section of the bypass groove between the working spaces 9 and 11 provides a throttling effect on fluid flow from the space 11 to the space 9 as the piston approaches the end of the travel-out stroke.

Figure 2:
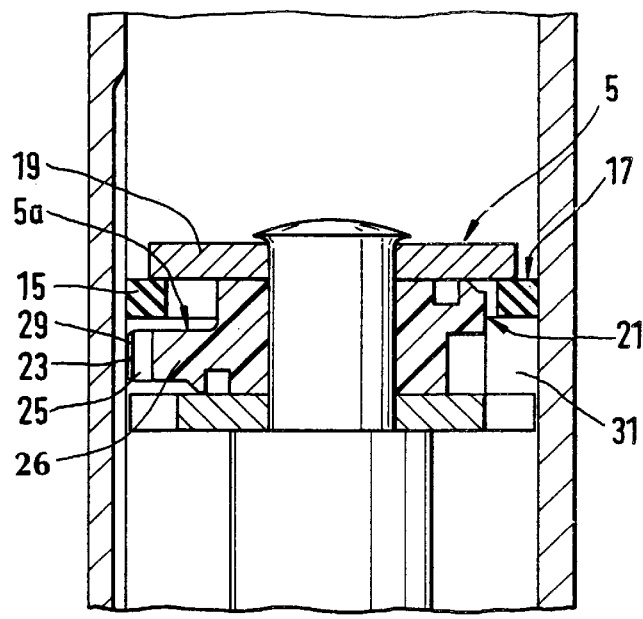
FIG. 2 is a fragmentary axial cross-sectional view of a portion of the embodiment of FIG. 1, which shows the piston assembly on a larger scale.

In addition to the bypass groove 13, or instead of the bypass groove 13, the piston assembly 5, as FIG. 2 shows, may have an axially movable piston ring 15, which, depending upon the direction of movement of the piston rod 3, blocks or unblocks a flow-through cross section 17. The piston ring 15 is displaced against the motion of the piston rod 3 by a frictional force exerted on it by the inner surface of the cylinder because of a radial prestress in the piston ring 15. The piston assembly has a ring retainer disk 19 which the axially movable piston ring 15 engages when the piston rod moves in the travel-out direction, thus restricting flow through the flow-through cross section 17, which is the gap between the periphery of the disk 19 and the inner surface of the cylinder. As is well-known per se, the piston assembly may have an arrangement for providing controlled restricted flow from the rod end section 11 to the closed end section 9 when the piston is extending. When the piston rod moves in the travel-in direction toward the closed end of the cylinder, the piston ring 15 moves out of engagement with the disk 19 and engages surfaces 5a of the piston body. The piston ring is guided in the radial direction by close clearances between the inside diameter of the ring and centering surfaces 21 of the piston body.

The piston body has a plurality of radially resiliently deformable wall portions 29, which are located in spaced-apart regions of its radially outer surface 23. Each of the wall portions 29 is separated from an adjacent corner portion of the piston body by an opening 25. The radially resiliently deformable wall portions 29 of the piston are under prestress with respect to the inner surface of the cylinder. The prestresses in each wall portion 29 exert a force on the piston that acts radially inwardly toward the axis of the piston, thus maintaining contact between the piston and the inner surface of the cylinder so that the piston in guided by the cylinder as it moves axially. Resilient deformations of the wall portions 29 toward and away from the openings 25 enable the piston to remain in contact with the inner surface of the cylinder, despite tolerance variations in the cylinder.

Figure 3A:
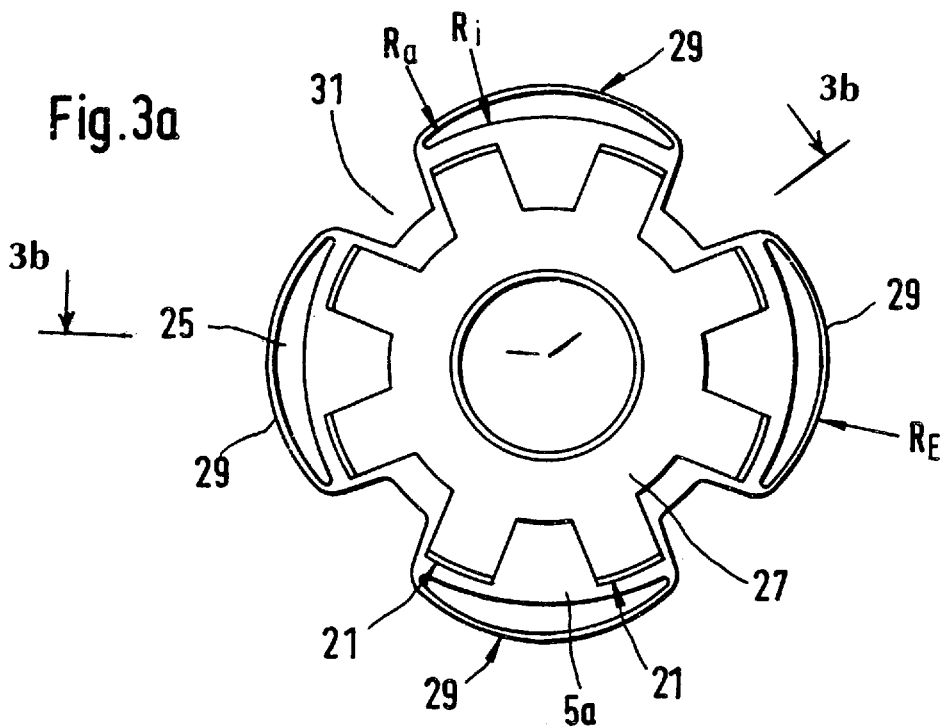
FIG. 3a is a top plan view of the piston body of the piston assembly of FIGS. 1 and 2.
Figure 3B:
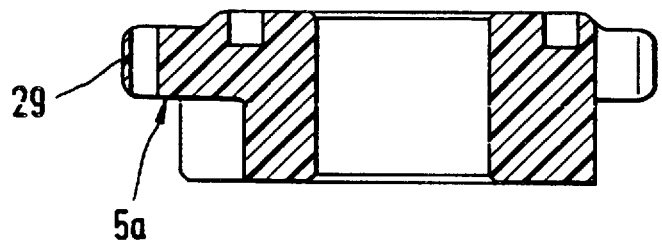
Figure 3C:
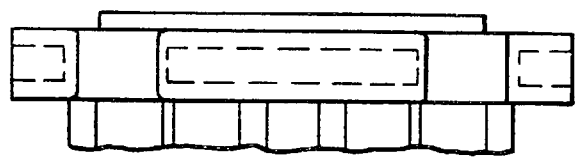
FIG. 3c is a partial side elevational view of the piston body of FIGS. 1, 2, 3a, and 3b.

FIGS. 3a to 3c show the piston body alone—without the other parts of the piston assembly. The piston body is of generally polygonal shape in plan, in this example a rectangle. A radially resiliently deformable wall portion 29 is provided at each corner 26 the piston, each wall portion 29 being defined by a crescent-shaped opening 25. It can be seen in FIG. 3a that there are recesses 31 between the corners of the piston. The inner surface of each wall portion 29—which forms the outer wall of each opening 25—is arcuate and has a radius Ra that is smaller than the radius Ri of an outer surface of the piston body that forms the inner wall of each opening 25. The thickness of the portion 29 is constant. The radius of the outer surface of each wall portion 29 is smaller than the radius H of the inner surface of the cylinder. Contact between the cylinder 7 and each of the wall portions 29 of the piston takes place at the center region of the wall portion and depending upon tolerance variations may involve essentially line contact or varying degrees of areal contact between the wall portions 29 and the inner surface of the cylinder.

The recesses 31 are located between the adjacent wall portions 29 and form portions of bypasses across the piston assembly, which are located downstream of the flow-through cross section 17 with respect to fluid flow past the piston assembly upon movement of the piston rod in the travel-in direction. The recesses 31 allow fluid to flow readily from the closed end space 9 to the rod end space 11 of the cylinder (See FIG. 1). Accordingly, there are no surface parts of the piston that provide no useful function in the peripheral portion of the piston.

Centering for the piston ring 15 is provided by a gear-like portion 27 formed by radial ribs on the piston body. The end surface 21 of each of the ribs is in close clearance with the inner surface of the piston ring 15. The radial mobility of the piston ring 15 (FIG. 1) is thus restricted.

The body of the piston assembly 5 is made of a moldable synthetic material. The centering surfaces, accordingly, are molded at the same time as the rest of the piston body, thus ensuring concentricity between the wall portions 29 and the centering surfaces 21.

Figure 4A:
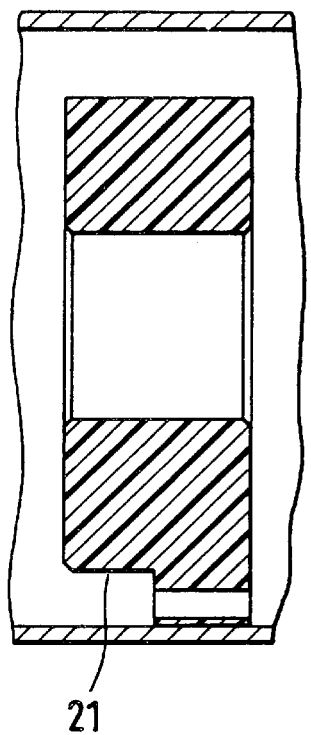
FIG. 4a is a side cross-sectional view of a modified piston body.
Figure 4B:
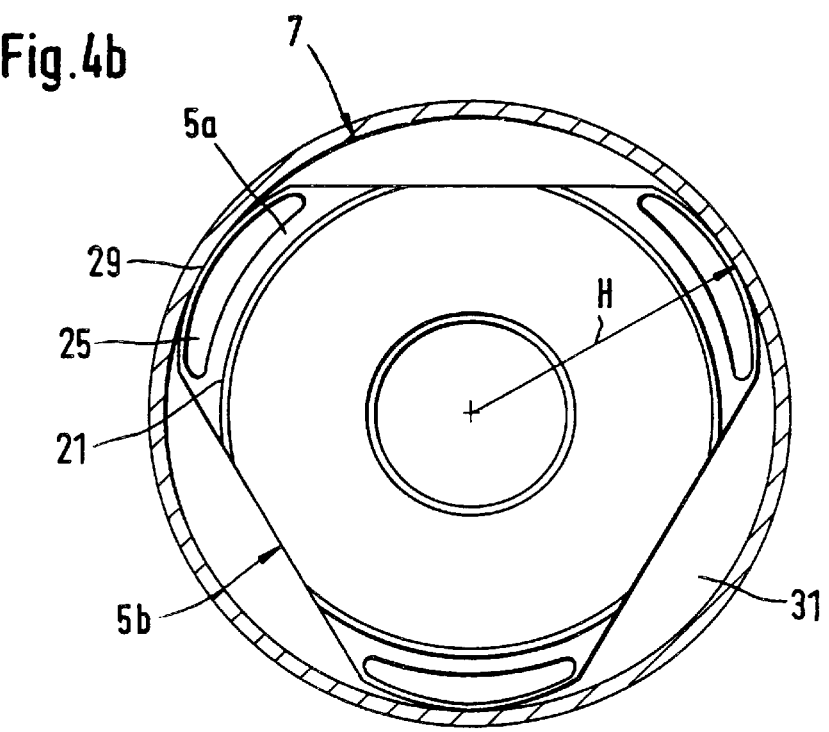

FIGS. 4a and 4b show a modified piston body that is the same piston in principle as the one shown in FIGS. 3a to 3c. In this example, the piston body has three radially resiliently deformable wall portions 29 that engage the inner surface of the cylinder, which is sufficient for guiding and centering of a piston. Consequently, this piston body has a basic triangular shape, where in each corner there is a radially resiliently deformable wall portion 29. This piston body, too, has centering surfaces 21, one located radially inwardly of each opening 25. In this piston body variant, the recesses 31 are formed by an edge 5b forming the triangle of the piston. On the whole, this piston design allows for an especially simple injection mold for piston production, since hardly any gaps exist between the edges-and surfaces.

In a piston rod motion in the travel-in direction, the piston ring 15 is displaced by the active frictional force between the piston ring and the cylinder against the retainer disk 19 of the piston assembly. At the same time, the openings 25, depending upon the sizes of the openings and of the piston ring, are largely or wholly blocked by the piston ring. The openings 25 play no role in fluid communication between the working spaces on opposite sides of the piston assembly, so that the configuration of the openings 25 is not subject to flow considerations.

What is claimed is:

1. A piston-cylinder unit, comprising a cylinder having an axis and an inner surface; and a piston assembly attached to a piston rod, received in the cylinder for axial movement, and having a piston body, the piston body being of generally polygonal shape in plan and having corners and recesses forming flow passages between the corners and having a plurality of radially resiliently deformable wall portions at a perimeter of the piston body, the wall portions being located at the corners and being spaced apart circumferentially from each other and each wall portion having opposite ends joined integrally with the piston body and being defined by an opening in the body, each wall portion being engageable with the inner surface of the cylinder and being adapted to deform resiliently radially with respect to the axis of the cylinder to compensate for tolerance variations in the inner surface of the cylinder.

2. The piston-cylinder unit according to claim 1, wherein each opening is curved in the circumferential direction with respect to the axis and is defined by an outer surface having a first radius and an inner surface having a second radius, the first radius being greater than the second radius.

3. The piston-cylinder unit according to claim 1, wherein an outwardly facing surface of each wall portion of the piston body has a radius smaller than the radius of the inner surface of the cylinder.

4. The piston-cylinder unit according to claim 1, wherein the piston assembly includes a piston ring, which is received on the piston body for axial movement relative to the piston body and depending upon its axial position unblocks or blocks a flow-through cross section of the piston assembly.

5. The piston-cylinder unit according to claim 4, wherein the piston body has centering surfaces for restricting radial movements of the piston ring.

6. The piston-cylinder unit according to claim 5, wherein the centering surfaces are arranged in the corners of the piston body.

7. The piston-cylinder unit according to claim 4, wherein the piston ring is received on the piston body between the radially resiliently deformable wall portions and a section of the cylinder that diminishes in volume when the piston rod moves in a travel-in direction.

\* \* \* \* \*